April 30, 1935. A. G. MADDOCK 1,999,468
CALENDAR
Filed May 28, 1934 2 Sheets-Sheet 1
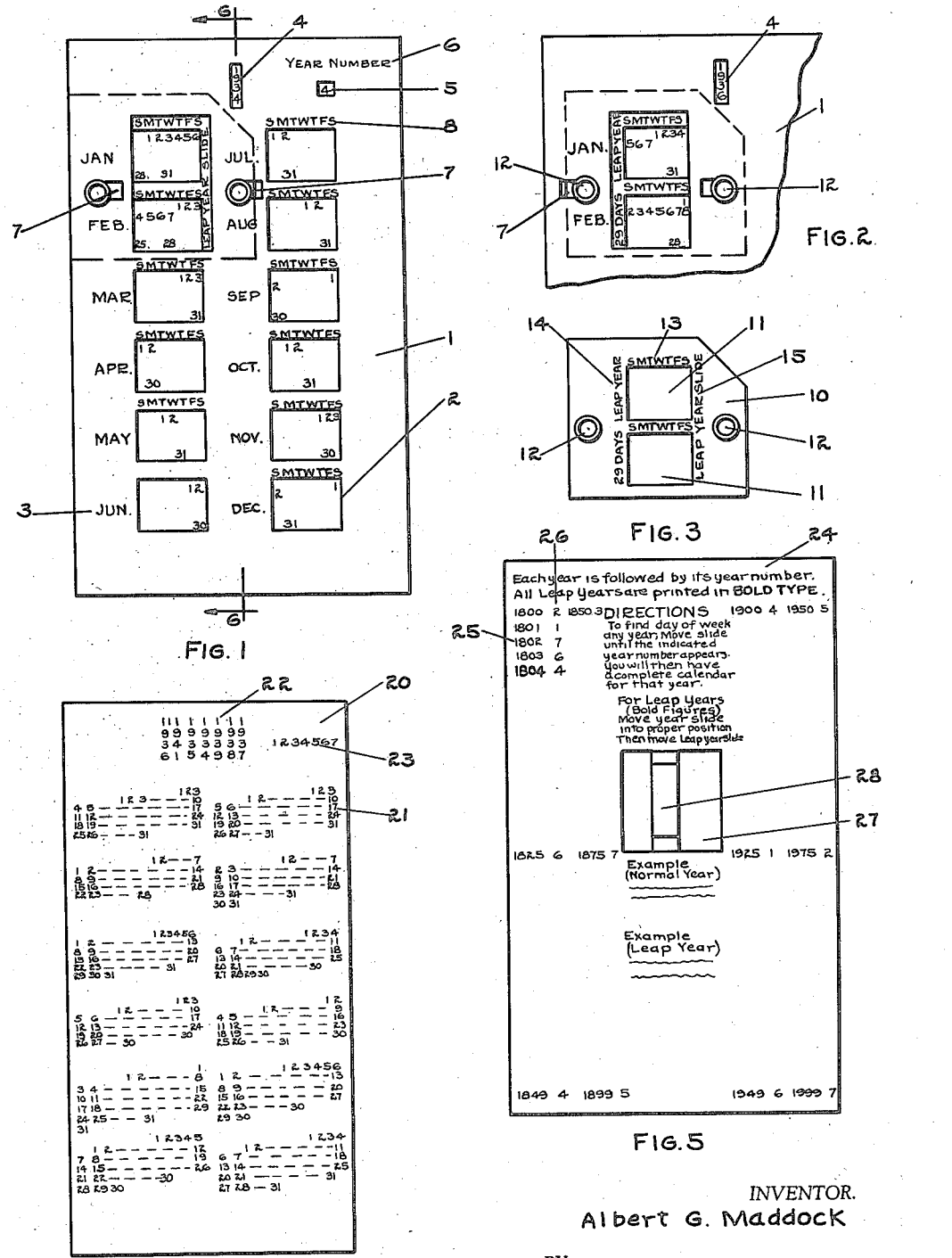
INVENTOR.
Albert G. Maddock
BY
Barnes, Kisselle, Laughlin & Raisch
ATTORNEY.

April 30, 1935. A. G. MADDOCK 1,999,468
CALENDAR
Filed May 28, 1934 2 Sheets-Sheet 2
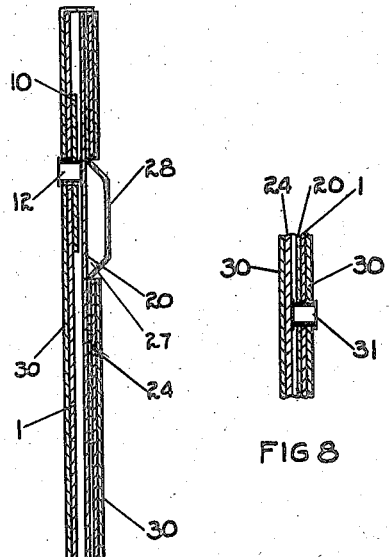
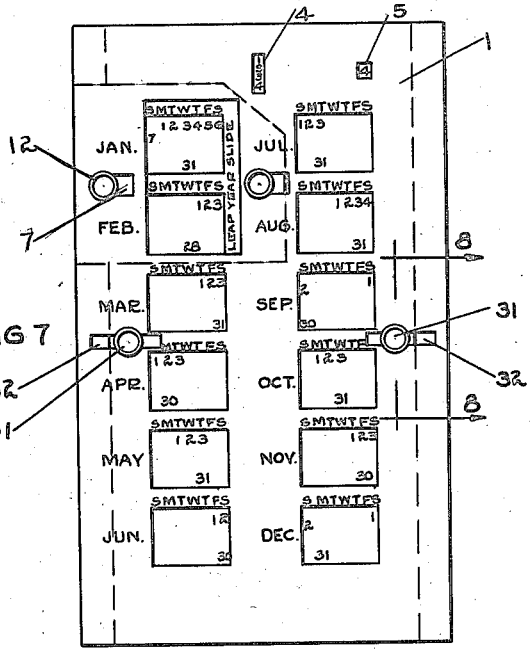
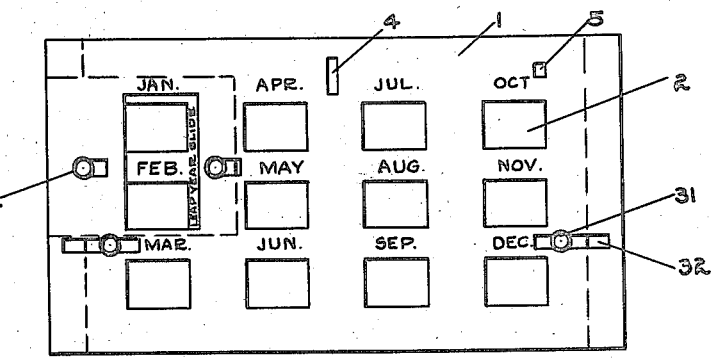
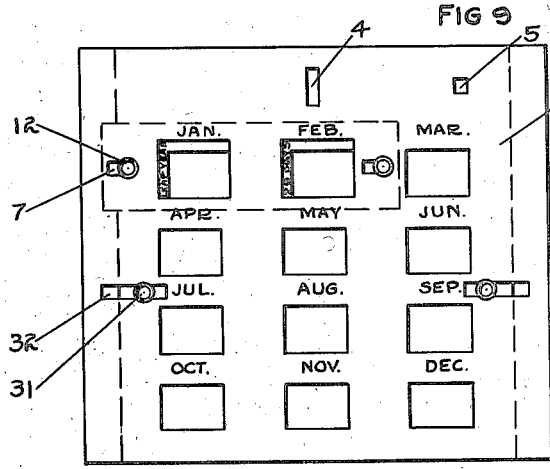
INVENTOR.
Albert G. Maddock
BY
Barnes, Kisselle, Laughlin & Raisch
ATTORNEY.

Patented Apr. 30, 1935

1,999,468

UNITED STATES PATENT OFFICE 1,999,468

CALENDAR

Albert G. Maddock, Detroit, Mich.

Application May 28, 1934, Serial No. 727,846

8 Claims. (Cl. 40—109)

This invention relates to a calendar of the perpetual variety. It is the aim of the invention to provide a calendar of simple construction, yet one which has adjustable features, so that the same may be adjusted and varied in order to show different calendar years and which may likewise be used for reference work in determining dates and the like of years long past or years in the future. The invention also aims to provide a simple and novel arrangement for accommodating leap-years, thus obviating the necessity of a double calendar arrangement in that the one calendar is suitable for all years. Further, the invention aims to provide a calendar structure which can be made in small sizes so that the same may be carried in the pocket of the user for ready reference.

In the accompanying drawings:

Fig. 1 is a front view of a calendar constructed in accordance with the invention and adjusted to the year 1934.

Fig. 2 is a front view showing the months of January and February, illustrating the adjustment for the leap-year.

Fig. 3 is a detail view of a leap-year slide.

Fig. 4 is a view showing the year slide and illustrating the numbers and indicia carried thereby.

Fig. 5 is an elevational view of a back member which may carry directions and tables as shown.

Fig. 6 is a sectional view taken through the calendar on line 6—6 of Fig. 1.

Fig. 7 is a front elevational view of the calendar, illustrating a modified arrangement for adjusting the year slide.

Fig. 8 is a detailed sectional view taken substantially on line 8—8 of Fig. 7.

Fig. 9 is a front view of a calendar showing a modified arrangement of the invention.

Fig. 10 is the front view of a calendar showing a still further modified arrangement.

The calendar, in its preferred form, has a front member or sheet 1 provided with apertures or openings therein as at 2 for each month of the year and each of which may be identified by the name of the month printed or otherwise placed on the face of the member 1 as illustrated at 3. The member may have also an aperture 4 through which the number of a current year may be seen as will presently be described. The member may have another aperture 5, which may be labeled with suitable indicia, such as the notation "year number" as illustrated at 6, the purpose of which will presently appear. In the form shown, the member 1 may have one or more slots 7 for accommodating manipulating devices on the leap-year slide. The face of the member 1 may have indicia thereon adjacent each aperture for the months March to December inclusive for showing the days of the week. For example, this indicia may comprise the first letter of each day of the week. This is used particularly in small sizes and such indicia is shown at 8.

The apertures for the months of January and February are of larger dimensions than the apertures for the remaining months, and a leap-year slide 10 is positioned back of the member 1 having apertures 11 for the months of January and February. Suitable means, such as finger pieces 12 may be attached to the slide 10 and arranged to project through the slots 7 so that the slide may be reciprocated with respect to the member 1. These finger pieces are preferably headed and may consist of hollow rivets or eyelets, although any other sort of finger pieces may be used. The leap-year slide is equipped with indicia 13 for indicating the days of the week and the same is visible through the relatively large openings in the member 1, and the slide may also carry indicia such as "29 days" "Leap-year" as shown at 14, and on the opposite side of the apertures 11, suitable indicia, as for example "Leap-year slide" as shown at 15.

The leap-year slide may be mounted immediately to the rear of the member 1 as illustrated in Fig. 6. In ordinary years the slide is to be positioned as shown in Fig. 1. In leap-years, it is to be positioned as shown in Fig. 2. This shift takes care of the odd day, as will presently be described.

To the rear of the member 1 and also to the rear of the leap-year slide is a sheet or member 20 bearing for each month a series of properly arranged numerals 21 and a series of numerals as at 22 for current years, and a series of numerals 23 useful for reference work. A sheet or back member 24 may be placed to the rear of sheet 20 and this member carries indicia such as years 25, opposite which appears what may be termed "year numbers" 26. This sheet preferably includes directions printed thereon as shown.

In the form thus far described the member 24 may have an aperture 27 through which an operating piece 28 is accessible, the operating piece being fastened to the back of the slide member 20. The member 28 may project through the aperture as illustrated in Fig. 6. The several members may appear in assembly as shown in Fig. 6 and may be encased in a suitable closure, preferably of transparent material such as celluloid or the like, as illustrated at 30.

The calendar is used as follows: The member 20, or year slide, may be adjusted by the means of the operating piece 28 to bring the number of any one of the current years into registry with the aperture 4. Thus the calendar may directly take care of a number of current years, as for example, seven years in the example shown. The slide is moved over one unit of movement for the year 1935, thus advancing the days; as for example Jan. 1, 1934, was on Monday, and in 1935 this day is advanced to Tuesday, and all other days are advanced one day. For the year 1936, however, a leap-year, the year slide 20 is advanced two units, thus advancing all days of the months two days forward in their respective weeks. This properly adjusts the months from March to December, inclusive. Now, the leap-year slide is shifted from the Fig. 1 position to the Fig. 2 position, thus setting back the months of January and February one day, the first of January falling on Wednesday, as illustrated in Fig. 2.

For reference work, the tables on the sheet 24 may be resorted to, and it will be noted that each year listed is given a year number. For example, if one wishes to refer to the year 1945, the year number is 4, and the sheet 20 is adjusted to bring the number 4 into registry with the aperture 5. The calendar now shows the year 1945. Leap-years are preferably shown in heavy faced type, and when the proper year number is brought into alignment with the aperture 5, the leap-year slide is to be positioned, as illustrated in Fig. 2, to properly show the calendar for that year.

The form shown in Fig. 7 illustrates how the year slide 20 may be actuated by operating pieces 31 extending through slots 32 in the member 1. The operating pieces may extend through the cover 30.

The modified forms shown in Figs. 9 and 10 illustrate how the calendar structure may be embodied in calendars having different arrangements of the months. The same reference characters are applied to these figures as have been used in the form of the invention previously described. In Fig. 9 the months are arranged vertically in four columns with three months in each column, thus dividing the twelve months into seasonal groups of three. In Fig. 10 the months are arranged in four horizontal columns, thus dividing the twelve months into seasonal groups of three. The leap-year slide is varied as to its form and dimension to take care of the relative position of the months of January and February, as in one case, January and February are vertically disposed and in the other case horizontally disposed.

The present disclosure, both as to description and drawings, is made for exemplary purposes to clearly bring out the essential features of the invention; and it is to be appreciated that structural variations may be employed without departing from the spirit of the invention. It is the intent to cover herein such structural variations as fall within the scope of the claims appended hereto.

It will be noted that the calendar always shows the days of the week in their proper or accustomed sequence. In other words, the weeks are shown as commencing with Sunday and ending with Saturday. This is true even for the months of January and February during leap-years, because the indicia for the days of the week appear on the leap-year slide, and the week is started with Sunday regardless of whether or not it is leap-year, as illustrated in Figs. 1 and 2 of the drawings.

I claim:

1. A calendar comprising a front member having an opening for each month of the year, a second member adjustable relative to the front member and having a group of figures for each month, with part of each group visible through an opening, and a third member between the front member and the second member having apertures for the months of January and February and for concealing some of the figures in the groups for January and February on the second member and adjustable relative to the front member and second member for setting the calendar for leap-years.

2. A calendar comprising a front member having an opening for each month of the year with the openings for the months of January and February larger than those for the other months, a second member adjustable relative to the front member and having a group of figures for each month with part of each group visible through an opening, a third member between the second and the front member having apertures for January and February which are of substantially the same size as the apertures in the front member for the months March to December inclusive, the apertures in the third member being in substantial alignment with the January and February apertures in the front member for concealing some of the numbers of the corresponding groups, said third member being adjustable relative to the front member and second member for setting the calendar for leap-years.

3. A calendar comprising a front member having an opening for each month of the year, a second member adjustable relative to the front member and having a group of figures for each month with each group arranged to have sufficient numbers showing through its respective aperture to display a full month, a third member positioned between the front member and the second member and having apertures, one for the month of January and one for the month of February and which are substantially aligned with the corresponding apertures in the front member and arranged to conceal from view some of the numbers for January and February, the front member having indicia thereon for the days of the weeks for the months March to December inclusive, the third member having indicia thereon for the days of the weeks for the months of January and February, said third member being adjustable relative to the front member and the second member for setting the calendar for leap-years.

4. A calendar comprising a front member having an aperture therethrough for each month of the year, a second member to the rear of the front member having a group of figures thereon for each month, said second member being adjustable relative to the front member to bring certain figures of each group into alignment with an aperture in the front member, the apertures in the front member for the months of January and February being larger than the apertures for the months March to December inclusive, a slide member between the front member and the second member having an aperture for January and an aperture for February with said apertures being substantially the same size as the apertures for March to December in the front member, the front member having indicia thereon for the days of the weeks for the months of March to December, the slide member having indicia thereon for the days of the weeks for the months of January and February, said slide member concealing some of the numbers in the group for the months of January and February and being adjustable relative to the front member and second member for setting the calendar for leap-years.

5. A calendar comprising a front member with apertures therein for each month of the year, a second member adjustable relative to the front member and having a group of figures thereon for each month of the year, a slide member between the front member and second member having apertures in substantial alignment with the apertures for January and February in the front member and arranged to conceal some of the numbers in the groups for these months, said front member having a slot therein, an operating piece fastened to the slide member and projecting through the slot in the front member by means of which the slide member may be adjusted to set the calendar for leap-years.

6. A calendar comprising a front member having an aperture therein for each month of the year, a second member adjustable relative to the front member and having a group of figures for each month of the year, some of which are visible through the apertures in the front member, a slide member between the front member and the second member having an aperture for January and an aperture for February arranged to conceal some of the numbers in the January and February groups and adjustable relative to the front member and second member for setting the calendar for leap-years, a back member adapted to carry a table or the like, and a transparent covering encasing all of said members.

7. A calendar comprising a front member having an aperture therein for each month of the year, a second member adjustable relative to the front member and having a group of figures for each month of the year, some of which are visible through the apertures in the front member, a slide member between the front member and the second member having an aperture for January and an aperture for February arranged to conceal some of the numbers in the January and February groups and adjustable relative to the front member and second member for setting the calendar for leap-years, a back member adapted to carry a table or the like, said back member having an aperture therein and an operating piece connected to the second member and accessible through said aperture in the back member.

8. A calendar comprising a front member having an aperture therein for each month of the year, a second member adjustable relative to the front member and having a group of figures for each month of the year, some of which are visible through the apertures in the front member, a slide member between the front member and the second member having an aperture for January and an aperture for February arranged to conceal some of the numbers in the January and February groups and adjustable relative to the front member and second member for setting the calendar for leap-years, a back member adapted to carry a table or the like, said back member having an aperture therein, an operating piece connected to the second member and accessible through said aperture in the back member, and a transparent covering encasing all of said members and having an aperture therein through which said operating piece is accessible.

ALBERT G. MADDOCK.